United States Patent Office  
3,475,043  
Patented Oct. 28, 1969

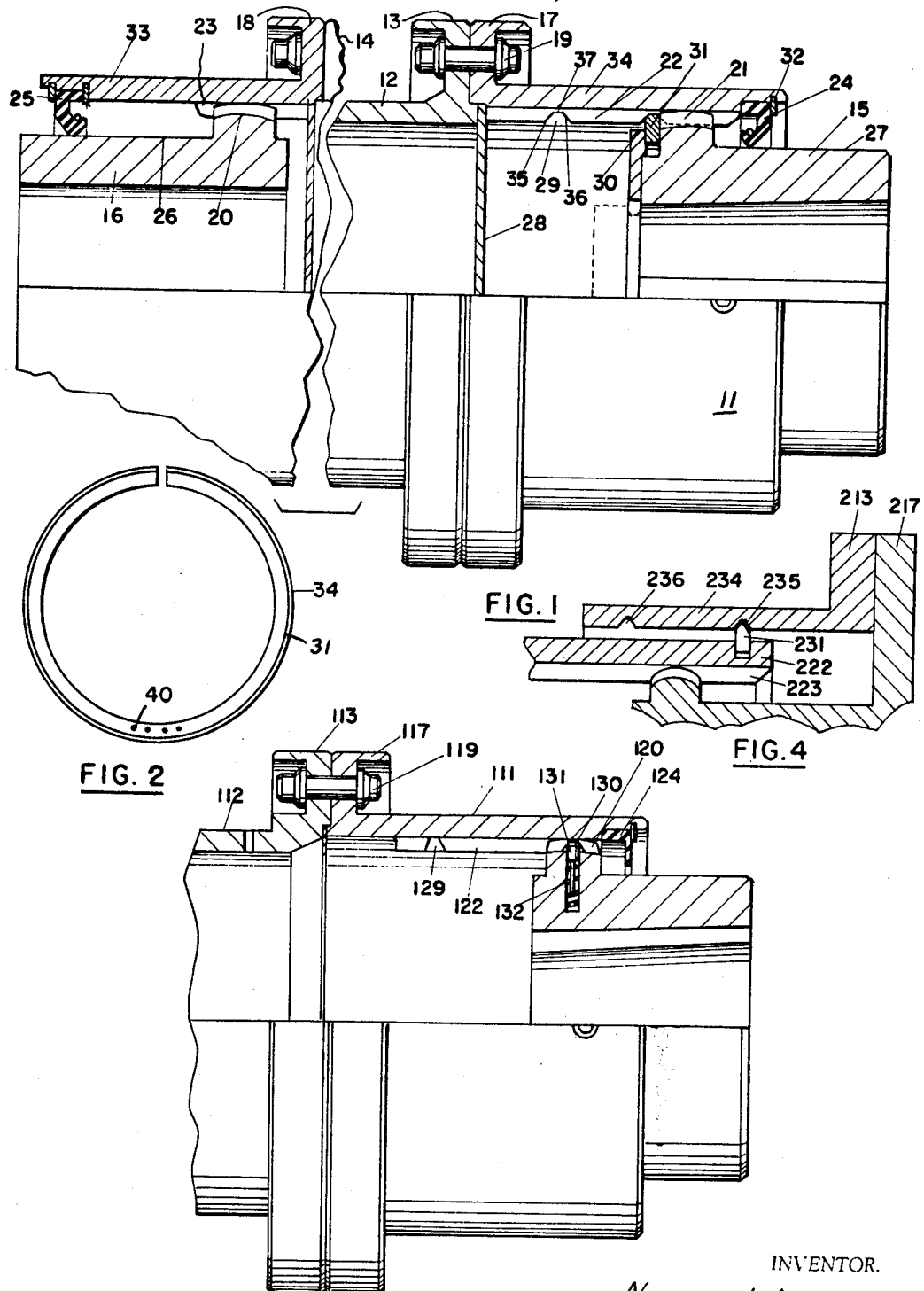

3,475,043  
DETENT MECHANISM FOR DISCONNECT COUPLINGS  
Norman J. Anderson, Erie, Pa., assignor to Zurn Industries, Inc., Erie, Pa., a corporation of Pennsylvania  
Filed Oct. 20, 1967, Ser. No. 676,809  
Int. Cl. F16b 7/00; F16l 21/00, 37/08  
U.S. Cl. 287—104                        6 Claims

ABSTRACT OF THE DISCLOSURE

A coupling for quick connection and disconnection of shafts as in standby or emergency mechanical power transmission. The coupling is made with crowned teeth to provide angular and parallel misalignment capacity. Both flanks and tips of the teeth are rounded or curved to provide for the misalignment capacity and the crowned tip of the teeth contacts the root of the internal gear in the external sleeve thereby accurately piloting the sleeve with true concentric ball and socket action. The sleeve is provided with internal teeth which engage the crowned teeth on both hubs. The sleeve can be slid from an engaged position where the teeth on both hubs engage the internal teeth on the sleeve to a position where the teeth on one hub are disengaged from the teeth in the sleeve. A detent ring having a tapered edge is provided which makes high speed disconnection possible. Another embodiment discloses detent pins. The detent is supported in the spaces between the teeth on one hub and it engages notches in the internal teeth in each of the engaged position and in disengaged position.

---

This invention relates to couplings and, more particularly, to the type of gear coupling known as a quick disconnect coupling.

Previous quick disconnect couplings of the type disclosed herein utilized ball detents to hold the couplings in either the connected or in the disconnected position. The detent pin having a conical end as disclosed herein makes high speed disconnect feasible whereas the detent ball could not develop enough locking force without upsetting or brinelling at the point of contact.

In another embodiment a split ring having a specific cross sectional shape is shown.

It is, accordingly, an object of the invention to provide an improved combination disconnect coupling and detent locking means.

Another object of the invention is to provide a combination coupling and detent which is simple in construction, economical to manufacture and efficient in use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 1 is a longitudinal view partly in cross section of the coupling according to the invention.

FIG. 2 shows the coupling ring in FIG. 1.

FIG. 3 is a longitudinal cross sectional view of another embodiment of the invention.

FIG. 4 is a partial schematic view of another embodiment of the invention.

Now with more particular reference to the drawing, the coupling is made up generally of two hubs 15 and 16 that have external teeth 20 and 21. The external teeth mesh with the internal teeth 22 and 23 on the sleeves 33 and 34.

Each of the hubs have a suitable hollow bore for receiving a shaft. Ring 31 is made of resilient material and is urged outwardly into the notches 29 or 30 depending on the position of the sleeve. Ring 31 has balance holes 40 formed in it. It will be noted that the ring has surfaces which converge toward each other and which are inclined at approximately the same angle as the sides 35 and 36 of the notches 29. The notches 29 have sides 35 and 36 and a bottom 37 as shown.

The sleeves 33 and 34 are held in fixed relation to each other by the spacer 12 which has the flanges 13 and 14 which are bolted to flanges 17 and 18 on their respective sleeves by bolts 19. Sealing washers 24 and 25 in the form of rings are shown inserted in grooves at each end of each sleeve and held in place by snap rings 32 disposed in suitable grooves. The outer peripheries of the hubs 26 and 27 are cylindrical and make a smooth rubbing surface with the sealing washers 24 and 25. A plate 28 clamped between the ends of teeth 22 and the end of spacer 12 provides a closure for the space between the sleeve and the hub so that lubricant will be maintained on the sleeve and hub teeth.

The ring 31 is made of a resilient material which causes the ends to separate as shown in FIG. 2 and thus the ring increases in circumference and is urged into the notches shown.

A suitable shifting arrangement can be provided by way of a shifting fork, hydraulic cylinder or the like, which is familiar to those skilled in the art, which can be made to engage the flanges 13 and 17 to move the sleeve from the position where the teeth 20 are in engagement with the teeth 23 to the disconnected position shown. It will be noted that the sleeve teeth 23 extend only halfway along the sleeve so that there are no teeth in engagement with the hub teeth 20 when in a position shown in FIG. 1.

In the embodiment of the invention shown in FIG. 3 the spacer 112 is similar to the spacer 12 in FIG. 1. The sleeve 111 similar to the sleeve 34 in FIG. 1. It has the internal teeth 122 similar to the teeth 22 in FIG. 1. Spaced rows of notches 129 and 130 are formed in the sleeve piece and the hub piece 120 engaged the sleeve piece 122. The detent pins 131 have conical ends which have conical sides of the same angle as the sides of the notches 129 and 130. The helical coil compression springs 132 urge these pins outward into these notches 129 and 130. The bolts 119 hold these flanges 113 and 117 together and a suitable lubricant seal 124 is provided as in FIG. 1.

The coupling shown in FIG. 3 can be shifted by a suitable shifting arrangement engaging the flanges 113 and 117, as in FIG. 1.

In the embodiment of the invention shown in FIG. 4, the detent 231 is supported in an outer peripheral groove in the outside of the sleeve. The detent has an outwardly inclined surface that engages inner peripheral grooves 235 and 236 in the outer member 234, which is attached to the flange 213. The flange 213 is fixed to the hub flange 217. Flange 217 is attached to the hub which has the hub teeth which engage the sleeve teeth 223.

The foregoing specification sets forth the invention in its preferred practical forms but the structure shown is capable of modification within a range of equivalents without departing from the invention which is to be understood is broadly novel.

The embodiments of the invention in which an exclusive property or privilege is claimed are defined as follows:

1. A coupling comprising:  
a sleeve,  
a first hub and a second hub,  
said sleeve having a first end and a second end, first internal teeth on said first end, said first hub having external teeth slidably meshing with said first internal teeth, means on said second end of said sleeve for engaging said second hub, at least a pair of axially spaced notches in each of said internal teeth, said notches being disposed in a first circular path and a second circular path spaced axially from said first circular path, said external teeth on said first hub meshing with said internal teeth on said sleeve and axially slidable thereon from a first position to a second position, a detent means in said first hub, spring means urging said detent means outwardly, said detent means having two inclined sides sloping radially outwardly and toward each other, the outer end of said detent means being received in said notches in said first circular path, when said sleeve is connected to said second hub, said sleeve being axially slidable to move said first sleeve teeth out of engagement with said first hub teeth and to move said detent means out of said first notches and into said second notches, said means on said second end of said sleeve being disengaged from said second hub when said detent means are in engagement with said second notches.

2. The coupling recited in claim 1 wherein the means connecting said second sleeve to said hub comprise teeth on said second hub, and said second hub teeth are disposed between said first sleeve teeth and said second sleeve teeth when said first hub teeth are disconnected from said first sleeve teeth.

3. The coupling recited in claim 1 wherein said detent means comprises pin members disposed in bores in said hub between said first hub teeth, said pin members having spring means urging them outward, said detent means comprising conical ends on said detent members engaging said first circular path when said sleeve is in a first position, said conical ends engaging said second circular path when said sleeve is in second position.

4. The coupling recited in claim 3 wherein said conical ends on said pins have sides that converge toward each other at an angle of approximately 45 degrees.

5. The coupling recited in claim 1 wherein said detent means comprises a ring disposed concentric to said first hub, means attaching said ring to said first hub, said ring having sides tapering outward and toward each other, said sides of said ring comprising said inclined sides.

6. The coupling recited in claim 3 wherein said teeth have tips that are crowned to lie in a surface of a sphere, and said pins are disposed in the longitudinal center of said teeth.

References Cited

UNITED STATES PATENTS

| | | | |
|---|---|---|---|
| 1,647,136 | 11/1927 | Johnson | 192—67 |
| 2,220,463 | 11/1940 | Sinclair | 192—67 |
| 2,651,394 | 9/1953 | Sinclair. | |
| 3,231,057 | 1/1966 | Wolf | 192—67 |
| 3,261,182 | 7/1966 | Allen et al. | 64—9 |
| 3,348,645 | 10/1967 | Sigg | 192—67 |
| 3,374,870 | 3/1968 | Johnston | 192—67 X |

DAVID J. WILLIAMOWSKY, Primary Examiner

W. L. SHEDD, Assistant Examiner

U.S. Cl. X.R.

64—9